US012347269B2

(12) United States Patent
Fong et al.

(10) Patent No.: US 12,347,269 B2
(45) Date of Patent: Jul. 1, 2025

(54) METHOD AND SYSTEM FOR CENTRALIZED CASINO PATRON AND ACTIVITY TRACKING, ANALYSIS AND REPORTING

(71) Applicant: Everi Payments Inc., Austin, TX (US)

(72) Inventors: Adam Fong, Las Vegas, NV (US); Kathleen Forbes, Las Vegas, NV (US); Allison Moffatt, Las Vegas, NV (US); Marcie Arai, Las Vegas, NV (US); Greg Farina, Las Vegas, NV (US)

(73) Assignee: Everi Payments Inc., Las Vegas, NV (US)

( * ) Notice: Subject to any disclaimer, the term of this patent is extended or adjusted under 35 U.S.C. 154(b) by 345 days.

(21) Appl. No.: 17/866,731

(22) Filed: Jul. 18, 2022

(65) Prior Publication Data

US 2023/0022553 A1 Jan. 26, 2023

Related U.S. Application Data

(60) Provisional application No. 63/223,834, filed on Jul. 20, 2021.

(51) Int. Cl.
*G07F 17/32* (2006.01)
*G06Q 50/34* (2012.01)

(52) U.S. Cl.
CPC ......... *G07F 17/3239* (2013.01); *G06Q 50/34* (2013.01)

(58) Field of Classification Search
CPC ............................ G07F 17/3239; G06Q 50/34
See application file for complete search history.

(56) References Cited

U.S. PATENT DOCUMENTS

| | | | | | |
|---|---|---|---|---|---|
| 3,732,559 | A * | 5/1973 | Eichelberger | H01J 31/128 345/24 |
| 5,159,549 | A * | 10/1992 | Hallman, Jr. | G07F 17/32 463/11 |
| 9,824,377 | B1 * | 11/2017 | Wheeler | H04L 67/02 |
| 2004/0002386 | A1 * | 1/2004 | Wolfe | G07F 17/3218 463/40 |
| 2006/0084502 | A1 * | 4/2006 | Downs, III | G07F 17/32 463/29 |
| 2006/0258427 | A1 * | 11/2006 | Rowe | G07F 17/32 463/16 |
| 2009/0276341 | A1 * | 11/2009 | McMahan | G06Q 40/12 235/375 |
| 2010/0169802 | A1 * | 7/2010 | Goldstein | G06F 16/958 707/802 |
| 2012/0123915 | A1 * | 5/2012 | Risnoveanu | G06Q 20/10 705/30 |
| 2014/0018154 | A1 * | 1/2014 | Petersen | G07F 17/3239 463/25 |
| 2014/0309028 | A1 * | 10/2014 | Lyons | G07F 17/3274 463/31 |
| 2015/0302482 | A1 * | 10/2015 | Vagner | G06Q 30/0269 705/14.66 |
| 2018/0053194 | A1 * | 2/2018 | Bond | G07F 17/3225 |
| 2022/0044199 | A1 * | 2/2022 | Pati | G06Q 40/02 |

* cited by examiner

*Primary Examiner* — Werner G Garner
(74) *Attorney, Agent, or Firm* — Snell & Wilmer LLP

(57) ABSTRACT

A system and method are provided for consolidating data from various casino systems to a central system, automatically performing due diligence on patron profiles using internal and external data, automatically identifying unusual patron profiles and transactions, and generating, submitting, and tracking AML reports.

20 Claims, 1 Drawing Sheet

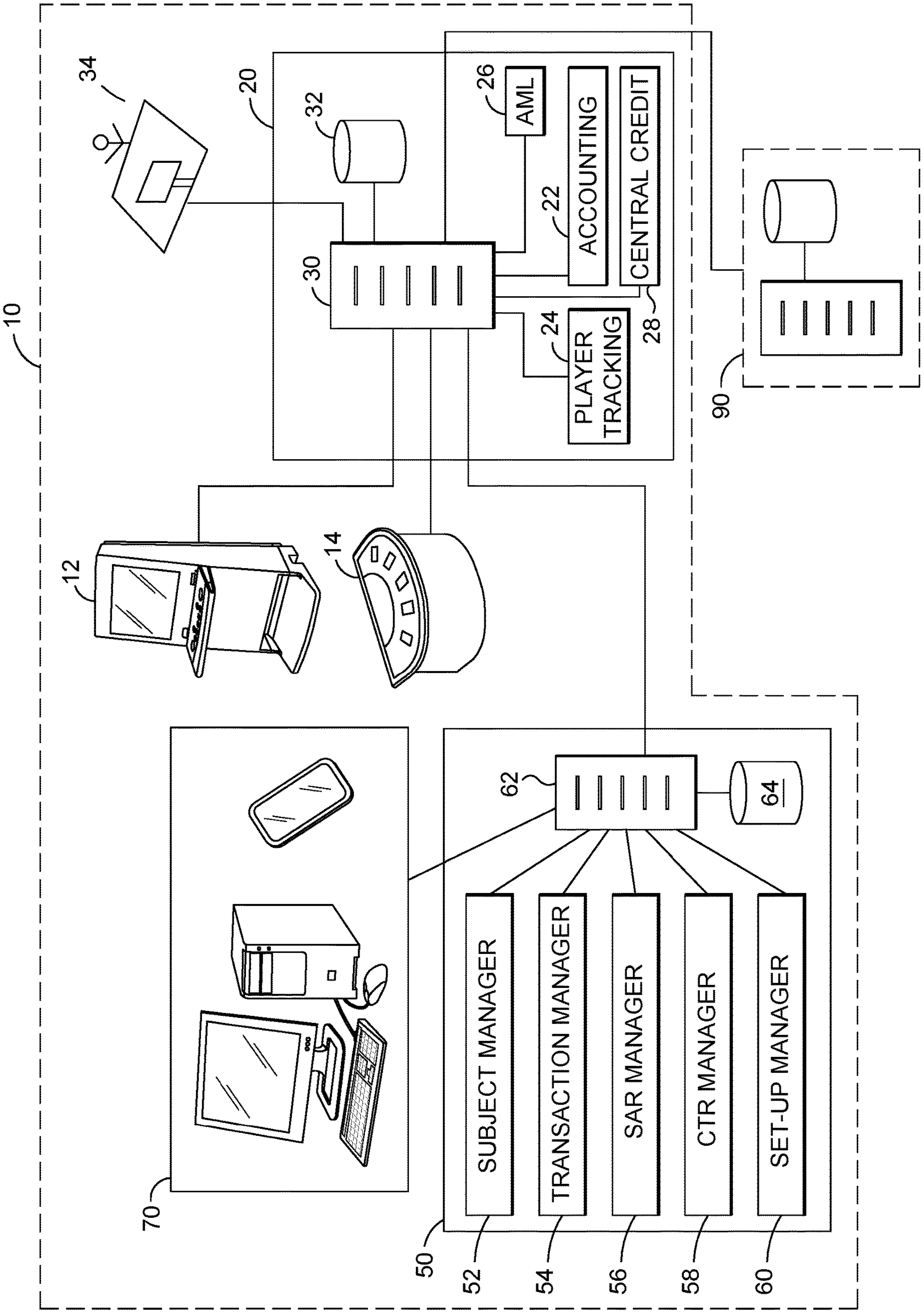
10
34
20
32
26
AML
ACCOUNTING
22
CENTRAL CREDIT
30
24
PLAYER TRACKING
28
90
12
14
62
64
70
SUBJECT MANAGER
TRANSACTION MANAGER
SAR MANAGER
CTR MANAGER
SET-UP MANAGER
50
52
54
56
58
60

METHOD AND SYSTEM FOR CENTRALIZED CASINO PATRON AND ACTIVITY TRACKING, ANALYSIS AND REPORTING

RELATED APPLICATION DATA

This application claims priority to U.S. Provisional Application Ser. No. 63/223,834, filed Jul. 20, 2021, which application is incorporated by reference herein in its entirety.

FIELD OF THE INVENTION

The present invention relates to systems and methods for consolidating data from various casino systems to a central system, automatically performing due diligence on patron profiles using internal and external data, automatically identifying unusual patron profiles and transactions, and generating, submitting, and tracking AML reports.

BACKGROUND OF THE INVENTION

In conventional casino management systems, patron profiles and transactions may be stored in separate systems, and may not be integrated, let alone integrated with other systems such as SAR, CTR, accounting, player tracking, etc. Further, separate casino properties may not be able to access one or more systems of other casino properties, where data may be duplicated for the same patrons. Finally, these separate systems in the casino may not be integrated with external systems to automatically retrieve data needed for validation and/or due diligence of patrons and/or transactions, and with external systems that address AML requirements and the casinos' reporting needs. A system to unify the separate systems is desired.

SUMMARY OF THE INVENTION

Embodiments of the invention comprise systems and methods for consolidating data from various casino systems to a central system, automatically performing due diligence on patron profiles using internal and external data, automatically identifying unusual patron profiles and transactions, and generating, submitting, and tracking AML reports.

One embodiment of the invention comprises a system for centralized casino patron activity tracking of patrons of a plurality of casinos which comprises a centralized casino patron activity server comprising a processor, a memory, a communication interface and machine-readable code stored in the memory and executable by the processor, and a database which is accessible by the processor of the centralized casino patron activity server, wherein the centralized casino patron activity server is in communication with at least a first casino management system of a first casino which stores information regarding a patron in association with a first patron ID and a second casino management system of a second casino which stores information regarding the patron in association with a second patron ID, and where the machine-readable code of the centralized casino patron activity server configured to cause the processor to: create a centralized patron record in the database for the patron in association with a third patron ID and which cross-links the patron to the first patron ID and the second patron ID, receive information regarding one or more activities of the patron at the first and/or second casino, and update the centralized patron record in the database with the information regarding the one or more activities.

The machine-readable code may be configured to cause the processor to create the centralized patron record in response to a search for the patron which does not reveal a record for the patron in the database.

The centralized patron record may comprise information regarding a patron status, such as at least one of banned and barred, and may further comprise a plurality of addresses of the patron, at least one of which is designated a master address and/or an outcome of one or more validations performed upon an identity or assets of the patron.

The machine-readable code may be configured to cause the processor to receive information from a third-party source regarding wealth of the patron and associate the information with the centralized patron record.

The machine-readable code may be configured to cause the processor to receive information regarding one or more associated actors of the patron and associate the information regarding the one or more associated actors with the centralized patron record. The one or more associated actors may comprise at least one of a person and an entity, and either the patron or the associated actor may be identified as a primary actor as between the patron and each associated actor.

The system may include at least one user device having a display, wherein the machine-readable code is configured to cause the processor to cause the display of the user device to display a subject manager graphical user interface which is configured to receive one or more search criteria for a search for a patron record in the database. The processor of the server may be configured to cause the display of the user device to display a patron record based upon information associated with the centralized patron record, the displayed patron record including at least one image of the patron.

The machine-readable code may be configured to cause the processor to generate transaction records corresponding to the one or more transactions, and generate a list of the transaction records. Each transaction record may comprise information regarding a monetary amount of the transaction, which amount comprises one or more of an amount of cash, chips and a monetary value ticket.

The machine-readable code may also be configured to cause the processor to generate one more suspicious activity reports (SARs) based upon the one or more transactions and be configured to cause the processor to group one or more of the SARs into a batch for processing.

The machine-readable code may also be configured to cause the processor to generate one or more currency transaction reports (CRTs) based upon the one or more transactions and cause the processor to cause the display of the user device to display a list of the CTRs and a processing status of each CTR.

In one embodiment, the machine-readable code which is associated with the server may comprise one or modules for implementing a subject manager (or patron/player) function, a transaction manager function, a SAR function, and a CTR function of the system.

Further objects, features, and advantages of the present invention over the prior art will become apparent from the detailed description of the drawings which follows when considered with the attached figures.

DESCRIPTION OF THE DRAWINGS

FIG. 1 illustrates one embodiment of a system of the present invention.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise systems and methods for integration of casino systems and anti-money laundering ("AML") systems to store data related to patron information and transaction information.

System Overview

One embodiment of a system of the invention is illustrated in FIG. 1. One or more casino gaming systems 10 are in communication with a centralized patron activity tracking, analysis and reporting system 50, which may be referred to herein as the "Entegrity system." Each casino gaming system 10 may be associated with one or more casino properties. Either or both the casino system(s) 10 and the Entegrity system 50 may be in communication with other systems or devices such as those of third-party vendors, third-party service providers, and/or government/regulatory systems, such as for monitoring AML activities and/or submission of AML-related forms/reports, tax forms/reports, or audit forms/reports.

The casino gaming system 10 may include a plurality of gaming devices, such as one or more gaming machines 12 (such as slot machines, video poker machines, etc.) and one or more gaming tables 14, at which one or more games, and preferably wager-based games which offer a patron/player the opportunity for winnings, are presented. In the case of gaming tables 14, a patron/player may place wagers with one or more monetary value chips and may be paid winnings in the form of chips. The patron/player may desire to cash out those chips by turning them in for monetary value (in currency/coins or equivalent funds to their financial account). In electronic table implementations, the gaming tables 14 may be configured to accept electronic monetary value credits for wagering, such as from a player balance of credits. Likewise, the gaming machines 12 might accept wagers in various formats, such in the form of monetary value credits from a credit balance associated with the gaming machine 12, which credit balance might be funded from currency or a value ticket provided to the gaming machine 12, from funds electronically transferred to the gaming machine 12, etc. The casino might include other devices or systems, such as associated with online gaming, sports wagering, etc.

The casino gaming system 10 may include a wide variety of other features or elements. For example, the casino gaming system 10 may include at least one first sub-system, such as a casino management system (CMS) 20 (or similar computing devices). Such a sub-system 20 may comprise one or more casino systems (whether operated by the casino or a vendor). As disclosed below, such systems may comprise an accounting system 22, a player tracking system 24, an AML system 26, a central credit system 28, or the like.

The first sub-system 20 may include at least one first server 30, which comprises one or more processors or controllers, at least one communication device or interface, a database or other data storage device 32, and one or more additional memory or data storage devices (such as separate from the database). In one or more embodiments, the processor(s) is configured to execute one or more instructions, such as in the form of machine readable code (i.e. "software"), to allow the first server 30 to perform various functions. The software is preferably non-transitory, such as by being fixed in a tangible medium. For example, the software may be stored in the one or more memory devices. One or more of the memory devices may be read-only. In addition, the software may be stored on a removable medium in some embodiments. In general, the one or more memory devices are used as temporary storage. For example, the one or more memory devices may be random access memory or cache memory used to temporarily store some user information and/or instructions for execution by the at least one processor.

The software may comprise one or more modules or blocks of machine-readable code. Each module may be configured to implement particular functionality when executed by the one or more processors, and the various modules may work together to provide overall integrated functionality. Of course, in certain embodiments, it is also possible for various of the functionality to be implemented as hardware, i.e. a processor or chip which is particularly designed to implement various of the functionality described herein.

In one embodiment, the first server 30 may include (or be linked communicatively at one or more times to) one or more input and/or output devices, such as a keyboard, mouse, touchscreen, video display or the like, whereby the processor may receive information from an operator or servicer of the first server 30 and/or output information thereto. This allows, for example, an operator of the first server 30 to interface with the first server 30 to upgrade, maintain, monitor, etc. In other embodiments, an operator might interface with the first server 30 via a separate workstation or other devices 34.

In one embodiment, the processor and other elements of the first server 30 may be linked and thus communicate over one or more communication buses. In this manner, for example, the processor may read/receive software from the memory for execution, receive inputs and provide outputs to the various I/O devices, receive information from or output information to external devices via the communication interface, etc. The one or more communication devices or interfaces permit the first server 30 to communicate with the gaming tables 14, gaming machines 12 and/or other gaming devices, and preferably external devices, networks, systems and the like.

The first sub-system 20 may, via the first server 30 (there may be a plurality of different servers which each implement different functionality) be configured to implement a variety of functionality.

In one embodiment, the first sub-system 20 may implement accounting functionality. The accounting functionality might include tracking of wagers made and winnings paid at the gaming machines 12, amounts wagered and won/lost at the gaming tables 14, amounts associated with monetary value tickets issued and redeemed, etc. In this regard, the first sub-system 20 may include other elements. For example, the casino might operate one or more cashier cages. These cages may be used to implement various functionality, such as allowing players to cash chips for currency, allowing players to cash checks for chips, allowing players to associate funds (such as from a credit card, bank account, or the like) with a wagering account, such as a sports wagering account, casino wagering account or the like. The accounting functionality may thus include tracking the amounts of casino chips issued and redeemed, checks cashed, etc. The cashier cage may include a cashier workstation, a monetary value dispensing mechanism, and other elements.

The first sub-system 20 might also implement player tracking and rewards functionality, such as by generating and maintaining player accounts for individual players, tracking wagering and other activities of the players, and issuing awards to players based upon their activities, such as points or the like.

The first sub-system 20 might implement central credit functionality 28, such as to accept credit applications for players, determine player credit-worthiness of players, generate credit lines for players, track amounts of credits issued to players, and implement collection efforts for unpaid amounts.

Various features of the Entegrity system 50 are preferably located at a casino and/or integrated into the casino gaming systems 10, while other features may be located remotely from the casino and/or the casino gaming systems 10. Further, not all features of the Entegrity system 50 need to be operated by a casino and/or be integrated into the casino gaming systems 10, but instead might be operated by one or more vendors or third-party service providers to the casino. In one embodiment, the functionality of the Entegrity system 50 may be provided relative to a single casino. However, the functionality may be implemented relative to a plurality (two or more) casinos, such as in entirely different locations, relative to the Entegrity system 50. This allows, for example, an operator of multiple casinos to operate the single Entegrity system 50 described herein relative to all of the casinos, in a centralized and integrated manner.

The Entegrity system 50 may comprise a number of elements, such as at least one second server 62 and at least one second database 64. The Entegrity system 50 may include other elements, such as one or more workstations and the like. Entegrity system 50 preferably comprises a processor, a memory, machine-readable code associated with the memory and executable by the processor, and one or more communication interfaces.

In one embodiment, as described in more detail below, the Entegrity system 50 may communicate with one or more of the systems in the first sub-system 20, such as the accounting system 22 or the player tracking system 24.

In one embodiment, the Entegrity system 50 may be in communication with the casino workstation or other device 34 or may include its own one or more workstations and/or portable or mobile processing devices 70. The workstation and/or portable processing device 70 preferably comprise a processor, a memory, machine-readable code stored in the memory and executable by the processor, at least one display (such as an electronic video display), and at least one user input device, which features may be associated with a housing of the device. The workstation and/or portable processing device 70 preferably also comprises a communication interface, such as a wireless communication interface which allows the device to be portable and still communicate with the second server 62. The workstation and/or portable processing device 70 may be a special purpose device (such as a device used by floor managers in casinos), or may comprise a general purpose computing device such as a tablet or similar device which is then provided with software for implementing the functionality described herein. In general, the workstation and/or portable processing device 70 may be configured to receive inputs and display information via the display thereof, such as one or more graphical user interfaces such as those described and/or illustrated herein. The graphical user interfaces or other information may be presented as part of a web-based application, such as where the server 62 acts as a webserver, and/or by an application executed on the device 70 receiving information from the server 62 which the application then uses to generate and display the information or interfaces.

In one embodiment, the Entegrity system 50 may include one or more, and preferably all, of the following modules: a subject manager module 52, a transaction manager module 54, a suspicious activity report ("SAR"—which term may be different in different jurisdictions, but generally comprises a report regarding activities which may be illegal, in frequent, uncommon, etc.) manager module 56, a currency transaction report ("CTR"—again, which term may be different in different jurisdictions, but generally comprises a report which may be required by one or more governmental agencies or entities regarding events or activities relating to a patron, the casino, etc.) manager module 58, and a set-up manager module 60. In general, the modules may be implemented as computer readable code which, when executed by a processor (such as of the server 62), implements functionality of the module.

In one embodiment, a user may be presented with an exemplary user interface that may be displayed in accordance with the main page of the Entegrity system 50, where the Entegrity system modules 52-60 may be accessed, such as illustrated in FIG. 2 of Appendix A. As indicated herein, the one or more interfaces may be displayed at on a user device, such as a user's mobile device, on a workstation or the like. In one embodiment, a user may be required to login to the system 50 in order to access the system or the various features thereof, such as by a user name and password. In some embodiments, users may have different levels of authorization that enable them to access or utilize different features or functions of the system 50.

In one embodiment, the subject manager module 52 may be configured to receive, store and/or process patron information, including patron profile information, and may be configured to implement or integrate with other functionality, such as validation and due diligence for compliance with AML regulations. The transaction manager module 54 may be configured to receive, store and/or process transaction information associated with the casino, and preferably financial or value-related transactions associated with the patrons. The SAR and CTR manager modules 56, 58 may be configured to facilitate the processing of SARs and CTRs, such as by generating and submitting such reports, such as for compliance with AML regulations. The set-up manager 60 may be configured to facilitate customization of the one or more modules depending on regulatory and/or casino needs. These modules 52-60 are discussed in more detail below.

As indicated above, the system 50 communicates with one or more casino systems, such as the casino management system 20 of each of a plurality of casinos. The system 50 may receive information from these systems 20, such as activity information. The activity information may comprise, for example, monetary value transactions (amounts wagered, won, etc.) by players or patrons of the casinos. In general, while CMS 20 of each casino may track players or patrons (such as by a casino-specific player tracking number or ID) and track related information, the present system 20 provides a wider range of functionality, as described herein. Further, the system 20 herein provides for centralized activity tracking, analysis and reporting across a plurality of casinos, including as to players or patrons who are separately identified by the different casinos (such as by different casino-specific player tracking IDs), addresses and other information. This centralized tracking and reporting also allows for the generation of suspicious activity and currency transaction reporting which is more accurate because it is based upon a global view of multi-casino activity.

Subject Manager Module

In accordance with the invention, patron profile/accounts may be created for individual casino patrons, organizations or the like (referred to as "subjects"). Importantly, this information may be stored in the database 64 associated with the system 50, thus allowing the data to be accessed by the one or more modules of the Entegrity system 50. Further, such patron profiles may be linked to patron profiles in other systems in communication with the Entegrity system 50, such that account information may be shared across systems. For example, an account for a patron may be created where that patron is identified or is associated with a first player ID at a first casino and a second player ID at a second casino, where the centralized player account is associated with a third ID or other identifier, thus linking the centralized player or patron account to the individual accounts/records at the different casinos. FIGS. 3-38 of Appendix A illustrate exemplary user interfaces that may be displayed in accordance with the subject manager module 52.

Appendix A FIG. 3 illustrates an exemplary user interface for the main page of the subject manager module 52, which may include a search/filter feature, and a results-display feature. The search/filter feature may include two or more types of searches. A first search type may be for individual patron profiles, which may include search criteria such as subject number (which are unique numbers assigned to each patron profile), player card number (which may be associated with player profiles in the player tracking system 24), patron information (such as name, address, birthday), tax identification number ("TIN"), identification ("ID") documentation number (which may be associated with any government-issued ID or any other such documents which a casino may accept), and general patron profile properties such as a profile identified as known, unknown, monitored, banned, barred, incomplete, foreign, accounts associated with warnings, or accounts where the patron address may be a P.O. box.

Appendix A FIG. 4 illustrates an exemplary user interface for the main page of the search/filter feature in the subject manager module 52, displaying a search type for organizations. An organization may be a subject other than an individual, such as a formal legal entity (company, etc.) or even a group of associated individuals. An organization search may include search criteria such as subject number (which are unique numbers assigned to each organization profile), organization information (such as name, address), employer identification number, and general account properties such as accounts identified as unknown, monitored, banned, barred, incomplete, foreign, accounts associated with warnings, or accounts where the organization address may be a P.O. box.

In one embodiment, any type search may first be performed in the Entegrity system 50, and if no match is found, databases from other systems 22-28 may be queried. For example, if a search for a patron does not reveal a patron profile in the database 64 associated with the Entegrity system 50, the Entegrity system 50 may facilitate (such as by communication with) a search for that patron in other systems or database, such of a database of the player tracking system 24 of the casino. In one embodiment, information from such external systems may be retrieved and displayed to the user of the Entegrity system 50, and may further be used to create a profile in the Entegrity system 50 and/or otherwise populate or update information associated with a profile or the like in the Entegrity system 50.

Patron profiles may include the following sections: information, transactions, due diligence, records, associations, and comments. Profile sections may be customized to revise grouping and to add/subtract fields depending on regulatory and/or casino needs.

As 5-15 illustrate exemplary user interfaces for the patron information section of the subject manager module 52. The overview section may include following grouping of information: overview, contact information, identification, player card information, and images. Information groups may be customized to revise grouping and to add/subtract fields depending on regulatory and/or casino needs.

Appendix A FIG. 5 illustrates an exemplary user interface for the overview page of a known patron profile in the subject manager module 52. For a patron profile to be identified as a known profile (for searching/filtering and other purposes), one or more fields may be required. In one embodiment, required fields may include first name, last name, gender, ID type, ID number, and ID country. Depending on regulatory and/or casino requirements, more fields may be required.

Appendix A FIG. 6 illustrates an exemplary user interface for the overview page of an unknown patron profile in the subject manager module 52. For a patron profile to be identified as an unknown profile (for purposes such as the search/filter feature), one or more fields may be required. In one embodiment, required fields may include gender, one or more physical descriptions, and/or one or more configured custom descriptors. Physical descriptions may include height, weight, race, hair color, eye color, age, and/or distinctive attire. Custom descriptors may include common colors, clothing types, etc., which may be frequently used and may be configured to be selectable or become part of an auto-suggestion and/or auto-fill feature. Depending on regulatory and/or casino requirements, more fields may be required and/or provided on the unknown patron profile page.

Other fields such as first name, middle name, last name, suffix, etc. may be set as optional fields. In one embodiment, additional fields such as address and ID-related fields may be disabled.

Depending on the casino property, patron profiles may be associated with various status such as "banned", "barred", and/or "with warning". Each casino property may have its own definition and method of handling such patron profiles.

Typically, a "banned" status identifies a patron as not permitted to be on a casino property, and/or may not permitted to participate in wagering-type games at the casino property. The patron may also wish to be self-excluded (requested to be excluded from legalized gaming activities).

Typically, a "barred" status is temporary, and may be removed upon a patron providing additional information (such as an ID or their social security number). Barred patrons may be excluded from gaming activities, but may still be permitted to engage in other activities on the casino property such as dining and retail.

Typically, a "with warning" status alerts a floor staff about a patron and/or a transaction. Such alerts may occur for when a patron profile is identified as incomplete (such as missing forms such as W-8BEN or W-9), when a patron profile is associated with multiple IDs, or when certain activities occur in a transaction (such as an attempt to cash a personal check).

Appendix A FIG. 7 illustrates an exemplary user interface for the overview page of a banned patron profile in the subject manager module 52. Information related to banned patron profiles may be retrieved from the Entegrity system 50 or any other system 20-24, 90 in communication with the Entegrity system 50, and/or may be manually entered. Profiles identified as banned may receive special coloring and/or other visual indicators when appearing as part of any subsequent searches by the Entegrity system 50 or any other system 20-24, 90 in communication with the Entegrity system 50. Ban entries may include a comment section for customizable descriptions.

Appendix A FIG. 8 illustrates an exemplary user interface for the overview page of a barred patron profile in the subject manager module 52. Information related to barred patron profiles may be retrieved from the Entegrity system 50 or any other system 20-24, 90 in communication with the Entegrity system 50, and/or may be manually entered. Profiles identified as barred may receive special coloring and/or other visual indicators when appearing as part of any subsequent searches by the Entegrity system 50 or any other system 20-24, 90 in communication with the Entegrity system 50. Bar entries may include a comment section for customizable descriptions.

Appendix A FIG. 9 illustrates an exemplary user interface for an overview page of a patron profile with one or more warnings in the subject manager module 52. Information related to patron profiles with one or more warnings may be retrieved from the Entegrity system 50 or any other system 20-24, 90 in communication with the Entegrity system 50, and/or may be manually entered. Profiles identified as having one or more warnings may receive special coloring and/or other visual indicators when appearing as part of any subsequent searches by the Entegrity system 50 or any other system 20-24, 90 in communication with the Entegrity system 50. Warning may include a comment section for customizable descriptions.

Appendix A FIG. 10 illustrates an exemplary user interface for the overview page of a patron profile identified as banned, barred, and with warning in the subject manager module 52. In one embodiment, a patron profile identified as banned, barred, or with a warning, may prompt the subject manager module to display a notification and/or icon to indicate such status on all user interfaces associated with the subject manager module.

Appendix A FIG. 11 illustrates an exemplary user interface for the contact information of a patron profile in the subject manager module 52, where separate grids (blocks, rows or graphical elements) are provided for each contact information type (address, phone, email, website, and IP address), and the viewer may customize the information displays.

Appendix A FIG. 12 illustrates an exemplary user interface for the address grouping feature of the contact information page in the subject manager module 52. All addresses associated with a patron profile may be grouped under their profile. Additional addresses may be retrieved from the Entegrity system 50 or any other system 20-24, 90 in communication with the Entegrity system 50, and/or be manually entered. A master address (such as the current address) may be selected from the plurality of addresses to be displayed as the default address on the overview page. In one embodiment, addresses identified as incorrect by the Entegrity system 50 and/or any other system 20-24, 90 in communication with the Entegrity system 50 may be removed or flagged. If a master address is identified as no longer valid, other associated addresses may be automatically and/or manually designated as the new master address.

Appendix A FIG. 13 illustrates an exemplary user interface for the ID page of a patron profile in the subject manager module 52, where ID information may be displayed. ID information may be retrieved from the Entegrity system 50 or any other system 20-24, 90 in communication with the Entegrity system 50, and/or manually uploaded. An ID image details panel displays the images associated with each ID (such as a scanned image of a patron's driver's license). One or more ID images may be associated with a patron profile. One ID image may be displayed as the default/main image for the ID page, with options for the viewer to customize the displays.

In one embodiment, the Entegrity system 50 may be integrated with other verification systems such that ID images and other documents in the Entegrity system 50 may be automatically validated and/or authenticated. The Entegrity system 50 may also be integrated with other reporting systems to automatically generate and/or submit reports for ID images and other documents identified as fake and/or suspicious documentation.

Appendix A FIG. 14 illustrates an exemplary user interface for the player card information page of a patron profile in the subject manager module 52, which may display any information retrieved from the player card system 24. Additional pages may be provided for other systems 20-28, 90 in communication with the Entegrity system 50, and the display of information may be customized and/or limited by the Entegrity system 50 and/or the other systems based on security requirements.

Appendix A FIG. 15 illustrates an exemplary user interface for the image page of a patron profile, which may display images uploaded for the patron's profile pictures. Images may be retrieved from the Entegrity system 50 or any other system 20-24, 90 in communication with the Entegrity system 50, copied from ID images, and/or be manually uploaded. One or more images may be associated with a patron profile. One image may be displayed as the profile image for the patron profile, with options for the viewer to customize the displays. Administrators of the Entegrity system 50 may also determine which image types may be used, and/or restrict image types for upload and/or viewing.

In one embodiment, surveillance systems may be linked to the Entegrity system 50, such that images and/or videos from such surveillance systems may be automatically and/or manually retrieved and stored to the Entegrity system 50, associated with one or more patron profiles, and/or displayed on the user interface for the image page of a patron profile. Image capture devices associated with other devices, such as kiosks/ATMs, gaming machines 12 and other devices at the casino, might also be used to capture image information which is provided to the Entegrity system 50.

Appendix A FIGS. 16-18 illustrate exemplary user interfaces for the patron transaction section of the subject manager module 52. The transactions section may include the following grouping of information: overview, summary, and details. Information grouping may be customized to revise groupings and to add/subtract fields depending on regulatory and/or casino needs.

Appendix A FIG. 16 illustrates an exemplary user interface for the overview page of the patron information section of the subject manager module 52, which may display an overview of the transactions associated with a patron profile, which may include transactions conducted at one or more casino properties. The display may be customized to a specified date range and may be represented graphically. In one embodiment, the overview may display transactions for a default date range of a predetermined number of days. Separate graphical displays may be provided for the in and out transaction types. Additional customization may be made to the display of the overview page, including the graphical representation of transactions (such as limiting transactions to one casino property). Transaction information may be retrieved from the Entegrity system 50 or any other system 20-24, 90 in communication with the Entegrity system 50, and/or manually entered.

Appendix A FIG. 17 illustrates an exemplary user interface for a summary page of the subject manager module 52, which may display a summary of all transactions associated with a patron profile. The default display of transactions may be grouped by year and month, with an option to expand the groups.

Appendix A FIG. 18 illustrates an exemplary user interface for the summary page in the subject manager module 52, which may display a detailed view of the transactions associated with a patron profile. The display may be customized to a specified date range. In one embodiment, the overview may display transactions for a default date range of a predetermined number of days.

Appendix A FIGS. 19-27 illustrate exemplary user interfaces for the due diligence section of the subject manager module 52, which may include the following grouping of information: validation, enhanced due diligence, source of funds and wealth, and comments. Information grouping may be customized to revise grouping and to add/subtract fields depending on regulatory and/or casino needs.

Appendix A FIG. 19 illustrates an exemplary user interface for the validation page of the subject manager module 52, where validations may be performed for a patron. Validations may include a tax identification number ("TIN") check, a death master file ("DMF") check, and an Office of Foreign Asset Control ("OFAC") check. Additional methods of validation may be added. Validation information may be retrieved from the Entegrity system 50 or any other system 20-24, 90 in communication with the Entegrity system 50, and/or manually entered. Edits to existing validation information, whether through the Entegrity system 50 or any other system 20-24, 90 in communication with the Entegrity system 50, may prompt the Entegrity system 50 to automatically save the prior version (such as in the form of a snapshot) and to note change information such as source, date, and all versions of the change, to preserve the integrity of the data associated with validation. The use and display of one or more validations may be configured and/or customized based on regulatory and/or casino needs, and access to the same may be restricted based on security requirements. Past validations may be stored and displayed, with options to filter by one or more criteria such as (date ranges, types of validation, etc.).

In one embodiment, the Entegrity system 50 may be integrated with other validation systems (such as an API from Transunion) to obtain additional validation data, and/or to perform one or more validations. Validation may also be performed using data stored in one or more casino properties, other systems linked to the Entegrity system 50, data from transactions, and data associated with other patron profiles (discussed below on agents and multi-profiles).

Appendix A FIG. 20 illustrates an exemplary user interface for the validation page of the subject manager module 52, where validation details may be accessed. Failed validations may be noted, and additional comments may be inserted and/or viewed.

Appendix A FIG. 21 illustrates an exemplary user interface for the enhanced due diligence page of the subject manager module 52, which may include at least the following worksheets: address, employment, and negative news. These worksheets serve as additional methods of validation. Worksheet information may be retrieved from the Entegrity system 50 or any other system 20-24, 90 in communication with the Entegrity system 50, and/or manually entered. Upon completion and submission of a worksheet, the status of the worksheet may be automatically updated to "verified." Worksheet information may also be used in other user interface pages in the Entegrity system 50. Past worksheets may be stored and displayed, with options to filter by one or more criteria such as (date ranges, types of validation, etc.). Edits to existing worksheet information, whether through the Entegrity system 50 or any other system 20-24, 90 in communication with the Entegrity system 50, may prompt the Entegrity system 50 to automatically save the prior version (such as in the form of a snapshot) and to note change information such as source, date, and all versions of the change, to preserve the integrity of the data associated with the workbooks.

Appendix A FIG. 22 illustrates an exemplary user interface for the address worksheet page, which may be used to edit, access, and verify a patron's address information and access secondary resources or information (such as Zillow, Google Maps, LexisNexis, Facebook, Instagram, etc.), such as for use in determining the wealth/capital of the patron.

Appendix A FIG. 23 illustrates an exemplary user interface for the address workbook page of the subject manager module 52, where address details may be accessed.

Appendix A FIG. 24 illustrates an exemplary user interface for the employment worksheet page of the subject manager module 52, which may be used to edit, access, and verify a patron's employment information, including as obtained from secondary sources (such as LinkedIn, Glassdoor, Google Maps, LexisNexis, Facebook, and Instagram, etc.).

Appendix A FIG. 25 illustrates an exemplary user interface for the negative news worksheet page of the subject manager module 52, which may be used to edit, access, and verify a patron's aliases and negative news, which may be obtained from third party resources (such as LinkedIn, Glassdoor, Google Maps, LexisNexis, Facebook, and Instagram, etc.).

Appendix A FIG. 26 illustrates an exemplary user interface for the source of funds and wealth page of the subject manager module 52, which may be used to edit, access, and verify a patron's assets, such as to be used as a source of funds for transactions used in casinos or as evidence of wealth/capital.

Appendix A FIG. 27 illustrates an exemplary user interface for the comments page of the subject manager module 52, which may be used to edit, access, and verify comments made in the validation detail page discussed above and illustrated in Appendix A FIG. 20. Additional documents may be uploaded, which may be associated with a particular validation and/or comment entry.

Appendix A FIGS. 28-32 illustrate exemplary user interfaces for the records section of the subject manager module 52, which may include the following grouping of information: overview, CTRs, SARs, Book Wagering Reports ("BWRs"), tax forms, cases, and incidents. Information grouping may be customized to revise grouping and to add/subtract fields depending on regulatory and/or casino needs.

Appendix A FIG. 28 illustrates an exemplary user interface for the overview page of the records section of the subject manager module 52, which may display an overview of the forms and records associated with a patron profile, including forms and records kept at one or more casino properties and/or maintained by the Entegrity system 50 or any other system 20-24, 90 in communication with the Entegrity system 50. The display may be customized to a specified date range and may be represented graphically. In one embodiment, the overview may display forms and records from a default date range of a predetermined number of days. Additional customization may be made to the display of the overview page, including the graphical representation of forms and records (such as limiting forms and records to one casino property). Forms and records may be retrieved from the Entegrity system 50 or any other system 20-24, 90 in communication with the Entegrity system 50, and/or manually entered.

Appendix A FIG. 29 illustrates an exemplary user interface for a summary tab of the CTRs page of the records section of the subject manager module 52, which may display a summary of all CTR reports associated with a patron's profile. The summary page may display basic information about the CTR reports, such as gaming date, CTR count, cash-in and cash-out for the transactions associated with the CTRs. CTRs are discussed in further detail below. The summary tab may include one or more options for searching/filtering such as date ranges.

Appendix A FIG. 30 illustrates an exemplary user interface for a details tab of the CTRs page of the records section of the subject manager module 52, which may display a summary of all CTRs associated with a patron's profile, which may display detailed information about selected CTRs.

Appendix A FIG. 31 illustrates an exemplary user interface for a summary tab of the SARs page of the records section of the subject manager module 52, which may display a summary of all SARs associated with a patron's profile. The summary page may display basic information about the SARs, such as date of creation of SARs, SAR count, amount of the transactions associated with the SARs. SARs are discussed in further detail below. The summary tab may include one or more options for searching/filtering such as date ranges.

Appendix A FIG. 32 illustrates an exemplary user interface for a details tab of the SARs page of the records section of the subject manager module 52, which may display a summary of all SARs associated with a patron's profile, which may display detailed information about selected SARs.

Appendix A FIG. 33 illustrates an exemplary user interface for the summary tab of the associations section page of the subject manager module 52. In one embodiment, the summary tab may display a tabular representation of other patron profiles associated with a patron profile, and the nature of such associations. A plurality of patrons may be associated with a patron profile. These associated patrons may be referred to as "actors". For example, a husband and wife may be identified as associated patron profiles. A patron may also operate through an agent, such as a high roller employing a personal assistant, to perform transactions. In such instances, the Entegrity system 50 may associate the respective patron profiles with each other for one or more modules (such as transaction, reporting, etc.). One patron may be identified as a primary patron, while additional patrons and/or agents may be associated with the main patron's profile. Such additional patrons and/or agents may require separate due diligence validation and/or entry of personal information. Transactions performed by such additional patrons and/or agents may be associated with the individual and/or the main patron.

In the summary tab, transactions associated with the patron profile as the primary patron may be displayed (such as on a left grid), and transactions associated with actors may be separately displayed (such as on a right grid). Actor profiles may be identified by subject numbers (as discussed above), and subject numbers may be expanded to display the associated patron profile. Double-clicking a row in a grid may open a details tab with the same date range auto-populated. As one aspect of the invention, this allows all transactions associated with a patron profile and its actors to be associated and viewed. Further, in one embodiment, the role of the subject may be swapped, such as between the "primary" and the "actor."

Appendix A FIG. 34 illustrates an exemplary user interface for the details tab of the associations section page of the subject manager module 52, where details about a transaction selected from the summary page may be displayed. In one embodiment, the default display may include transactions within a predetermined number of days (such as 120 days), with the option to change the date range and/or to customize other displays options. A search/filter feature may also be provided to filter by patron profiles, relationships (such as primary, agent/multi-patron, or both). Patron profiles displayed in the details tab may also display associated subject numbers. In one embodiment, subject relationships beyond primary/agent may be designated, such as by associating an individual subject (such as a patron) with another subject which is a vendor or employer. In this manner, all patrons who are employees of a particular employer may be identified, activities of a patron may be tied to a vendor or employer or the like.

Appendix A FIG. 35 illustrates an exemplary user interface for the public tab of the comment section page of the subject manager module 52. Comments may be retrieved from the Entegrity system 50 or any other system 20-24, 90 in communication with the Entegrity system 50, and/or manually entered. Comments may be designated as public or private. In one embodiment, the authority to add, remote, edit, and/or view comments may be restricted to one or more user accounts. Such authority may be limited to private comments, public comments, and/or both, and such authority may be set and/or adjusted depending on security and/or casino needs. It is contemplated changes to existing comments, whether through the Entegrity system 50 or any other system 20-24, 90 in communication with the Entegrity system 50, may prompt the Entegrity system 50 to automatically save the prior version (such as in the form of a snapshot) and to note change information such as source, date, and all versions of the change, to preserve the integrity of the data associated with the comments.

Appendix A FIG. 36 illustrates an exemplary user interface for the private tab of the comment section page of the subject manager module 52, which may be visible to one or more user account with the authority to view one or more comments.

Appendix A FIG. 37 illustrates an exemplary user interface for the subject validation history page of the subject manager module 52, which may display all validations performed for a selected property. The history page may be further filtered by additional categories such as date range, validation status (such as passed, failed, error, etc.), validation type (such as TIN, DMF, OFAC, as defined below), amended checkbox (to display validations that were amended to change the status such as "pass" to "fail" or "fail" to "pass"), and additional subject identification (such as player card number, subject number, first Name, last Name, etc.).

The history page may display the following and more: subject number, validation type, date or time, first name, last name, validation status, validation results, and user who performed the validation. The display may be customized with additional columns including but not limited to: comments, ID number, ID state, TIN (defined below), ZIP code, OFAC (defined below) list date (date of publication of OFAC list), middle name, user who amended the validation result, amendment date, product source (to identify the system and/or module that performed the validation), vendor source (to identify the source used to run the validation, such as TINCheck, Everi, etc.), property ID, property name, etc. The user may also directly view, amend, and/or remove validation results on the history page.

Appendix A FIG. 38 illustrates an exemplary user interface for the overview page of an organization profile in the subject manager module 52. A "most recent associate" feature allows the association of one or more patron profiles with one or more organization profiles to identify patrons who conducted transactions for organizations.

Transaction Manager Module

As indicated above, the system of the invention may implement transaction manager functionality. Aspects of this functionality will be described with reference to Appendix A FIGS. 39-68, which illustrate exemplary user interfaces that may be displayed in accordance with operation/use of the transaction manager module 54.

Appendix A FIG. 39 illustrates an exemplary user interface for the main page of the transaction manager. The main page may include a transaction watch module with color-coding options for subjects with transactions (such as to provide for simple visual indication of the status of a subject). Transactions may be filtered by subjects with regulatory, non-regulatory, or taxable transactions. Regulatory transactions may be transactions that have been configured to be reportable in CTRs. Non-regulatory transactions may be transactions that have been configured as not reportable in CTRs. Taxable transactions may be transactions that are subjected to federal tax, state tax, or any other form of taxation. Additional filters may be added in other embodiments or may be manually set by administrators depending on the need of the particular casino utilizing the system and method of the invention.

The transaction watch module 54 may be updated in real-time based on communications with other systems 20-28, 90. Additional transactions may also be manually added using the "Add Transaction" button.

The main page may also include a filter module whereby transactions may be filtered by general properties such as date, casino property, and transaction type (such total cash in or total cash out), patrons, or organizations. Patron filters may include general properties (such as known, unknown, banned, barred, or incomplete patron profiles), visual characteristics (such as gender, race, description/attire, hair color, eye color, height, weight, age, etc.), or additional information (such as name, last known location, etc.). In one embodiment, additional filtering criteria may include patron biometrics and alternate technology such as fuzzy searches to identify patrons based on approximate visual characteristics (such as approximate weight, height, age), and automatic or manual linking of multiple profiles based on similar characteristics (which may indicate the same patron is identified under multiple profiles).

Appendix A FIG. 40 illustrates exemplary user interfaces for the filter module in the transaction manager module 54. Previous transactions and/or searches may be stored in the Entegrity system 50, by default or manually, which may then be used for future searches/filters. The main page may include a feature to search the transaction watch module by subject (such as by a first or last name), thereby auto-populating search fields with the same names and automatically performing the search in Transaction Entry or Subject Profile, thereby reducing multiple searches.

One or more filter options listed above may be associated with default color coding in the transaction watch module. For example, transactions associated with unknown patrons may appear in red. Non-default color coding may be configured in the setup manager and/or inserted manually. For example, if tasked with identifying banned patrons, a user with authorization and/or permission to change settings may configure a color for all banned patrons with a total cash-in or cash-out amount less than or greater than a certain threshold amount. User accounts may include an authorization to change the color coding, and such authorization may be restricted to one or more user types. Customized color coding based on filter properties is an improvement on the conventional method for color-coding transactions and/or subject profiles. The conventional method was based on dollar amounts, and thus, the transaction manager module may only search or filter by dollar amount. This limited search and filter option may not address the additional need to identify other higher priority matters for regulatory purposes such as identifying fraudulent activities.

High priority matters may also prompt the Entegrity system 50 tray pop-up shown on the main page. Default pop-up notifications may be associated with attempted transactions by a player who will exceed a predetermined threshold amount for total permitted transactions. The pop-up may remain visible after a player has exceeded that threshold. Additional pop-up notifications may be manually set or added by an administrator. These pop-up notifications may be automatically system generated.

A list of notifications may be generated on the main profile to identify a plurality of high priority matters, warnings, and/or pop-up notifications, which is an improvement on the conventional method where warnings associated with a particular patron or transaction may only be viewed by accessing the patron's profile, or the transaction profile.

Appendix A FIG. 41 illustrates an exemplary user interface for the main page of the transaction manager module 54, where the filter module may be collapsed.

Appendix A FIG. 42 illustrates an exemplary user interface for the main page of the transaction manager module 54, where a subject card may be displayed in association with a patron. The patron may, in turn, be associated with a transaction and/or filter result. The subject card may display information already in the Entegrity system 50, and may be further edited from modules such as "Floor Monitor," "Transaction Entry," "Transaction Details," "Transaction Summary," and/or "Sub-Transaction Details". These modules may also be associated with auditing features. This feature of the transaction manager module 54 permits a user to select a patron and view all associated transactions for the patron (and select transactions to obtain more detailed information), such as by day, etc.

The information on the subject card may be retrieved from the Entegrity system 50 or any other system 20-24, 90 in communication with the Entegrity system 50. Such information may be manually entered or may be read from a patron loyalty card, ID card, or any other documents provided by the patron. Upon entry then Entegrity system 50 may consolidate patron profiles with duplicative information such as duplicative addresses or ID numbers. Some information may only be considered duplicative of the information is identical (such as in the case of ID numbers), while other information may be considered duplicative of the information is similar (such as “s” vs. “south” or “rd” vs “road” for addresses). The subject information may include clickable warnings to identify problems (such as missing information).

Appendix A FIG. 43 illustrates an exemplary user interface for a pop-up window which may be displayed for a comment module associated with the subject card discussed above and illustrated in Appendix A FIG. 35. Comments may be retrieved from the Entegrity system 50 or any other system 20-24, 90 in communication with the Entegrity system 50, and/or may be manually entered. Custom filters, as discussed above and illustrated in Appendix A FIG. 3, may be created based on such comments.

Appendix A FIG. 44 illustrates an exemplary user interface for the subject card portion of the main page of the transaction manager module 54, where visual characteristics (such as physical description, distinctive attire, or any additional visual characteristics discussed above) may be manually entered. As one aspect of the invention, a user may input or alter information associated with the subject card in the transaction manager module 54, which inputs or changes are then stored and reflected across the system, such as when the patron’s profile is accessed in the subject manager module.

Appendix A FIG. 45 illustrates an exemplary user interface for a pop-up window which may be displayed for a due diligence validation module in the transaction manager module 54. Due diligence validation may be retrieved from the Entegrity system 50 or any other system 20-24, 90 in communication with the Entegrity system 50, and/or may be manually entered. The pop-up window for the due diligence validation module may also automatically appear as a high priority matter, as discussed above, or be retrieved from the list of notifications discussed above. In one embodiment, the default validation methods discussed above and illustrated in Appendix A FIGS. 84-92 may be used. Other types of due diligence validations may be added. Validated information may be used to complete transactions, issue credits, generate reporting forms such as W8/W9 forms, identify warnings, identify incomplete profiles, and/or identify issues that may cause a patron to be barred or banned, etc.

Appendix A FIG. 46 illustrates an exemplary user interface for a pop-up window, where additional information such as Foreign ID and country of residence may be optional and/or gathered for future use, including but not limited to tax forms such as form 1042-S.

Appendix A FIG. 47 illustrates an exemplary user interface for a pop-up window, which may include manual entry of date an identification form W-8BEN or form W-9 was collected for a subject profile. This interface also permits a user to create such a form if one is not already associated with the system.

Appendix A FIG. 48 illustrates an exemplary user interface for a pop-up window, which may be displayed for a banned patron in the transaction manager module 54, where the reason for ban may be viewed in expanded form, and/or may be updated. Ban information may be retrieved from the Entegrity system 50 or any other system 20-24, 90 in communication with the Entegrity system 50, and/or manually entered.

Appendix A FIG. 49 illustrates an exemplary user interface for a pop-up window, which may be displayed for a patron with an associated warning message (such as patrons profiles with missing information, incomplete validations, duplicative or suspicious entries, etc.) in the transaction manager module 54, where the reason for warning may be viewed in expanded form, and/or may be updated. Warning information may be retrieved from the Entegrity system 50 or any other system 20-24, 90 in communication with the Entegrity system 50, and/or manually entered.

Appendix A FIG. 50 illustrates an exemplary user interface for a pop-up window in the transaction manager module 54, which may be displayed for a patron profile with missing information.

Appendix A FIG. 51 illustrates an exemplary user interface for a subject card with a validation status icon in the transaction manager module 54. A different color coding and/or icon may be displayed for incomplete validation, complete validation, failed validation, and additional status that may be added by default or as a custom status.

Appendix A FIG. 52 illustrates an exemplary user interface for a pop-up window, which may be displayed for a patron profile where one or more due diligence validation has been performed in the transaction manager module 54. The overall status may contain the same or similar color coding and/or icon as discussed above and illustrated in Appendix A FIG. 51.

Appendix A FIG. 53 illustrates an exemplary user interface for a transaction entry module in the transaction manager module 54, where pay-in and pay-out transactions may be recorded.

Appendix A FIG. 54 illustrates an exemplary user interface for the transaction entry module in the transaction manager module 54, where one or more instrument/monetary/tender types (such as cash, ticket, chips, etc.) may be entered as part of the same transaction (also known as “mixed-type tenders”). For example, a patron may wish to exchange $3,000 in cash for $2,000 in chips and $1,000 in tickets. Conventional methods require the input and processing of separate instrument/monetary/tender types even though the transactions are all performed as part of a single transaction, such as entry of separate transactions for the $2,000 cash to chips exchange and the $1,000 cash to chips exchange. In contrast, the Entegrity system 50 provides the ability to document the two exchanges as a single transaction, which in turn provides for accurate reporting for taxes and regulation purposes.

Appendix A FIG. 55 illustrates an exemplary user interface for the subject card in association with the agent and/or multi-patron module in the transaction manager module 54. Association between more than one agent/patron profile is discussed above and illustrated in Appendix A FIG. 33.

In one embodiment, the main patron may be updated. For example, a first patron may initially be identified as the main or primary patron, while a second patron and a third patron may be identified as additional patrons associated with the main patron. At a later point, the second patron may be identified as the main patron such that the first patron becomes an additional patron associated with the main patron. Similar updates may be performed between patrons and agents.

Appendix A FIG. 56 and Appendix A FIG. 57 illustrate an exemplary user interface for the transaction entry module in the transaction manager module 54, where transactions may be moved from one subject to another. For example, a cashier at the main cage may document a transaction by a patron but may not have the time or authority to identify the patron in the Entegrity system 50. It may also be the case that the patron does not have an existing patron profile in the Entegrity system 50. A floor manager may at a later point establish such patron profile and/or identify the patron, and move the recorded transaction to be associated with the patron profile. The transaction entry module may also be used to fix errors, such as a manually-entered transaction being accidentally added to the wrong patron profile. The transaction entry module may also assist with merging profiles where, for example, duplicative patron profiles in another system in communication with the Entegrity system 50 caused duplicative patron profiles in the Entegrity system 50, and a merger of the two profiles may be desired. Upon such merger, transactions associated with one or both patron profiles may need to be moved to the merged patron profile for compliance and consistency.

Appendix A FIG. 58, Appendix A FIG. 59, Appendix A FIG. 60, and Appendix A FIG. 61 illustrate additional exemplary user interfaces for the main page of the transaction manager module 54, where a column display may be customized, and multiple transactions may be selected for editing and/or filtering. In one embodiment, customized column arrangements may be saved, exported, loaded at any point to allow users to create custom views of each transaction manager screen.

Appendix A FIG. 62 illustrates an exemplary user interface for the reporting module in the transaction manager module 54, where a multiple transaction log ("MTL") report may be generated from the main page of the transaction manager module.

Appendix A FIG. 63 illustrates an exemplary user interface for the reporting module in the transaction manager module 54, where a negotiable instrument log ("NIL") report may be generated from the main page of the transaction manager module.

Appendix A FIG. 64, Appendix A FIG. 65, and Appendix A FIG. 66 illustrate exemplary user interfaces for displaying and updating sub-transaction details associated with the transaction manager module 54. The Entegrity system 50 may permit recording of high-volume transaction types (also referred to as "sub-transactions") as a single aggregated record. This reduces the amount of transactions shown in the transaction manager module, to make the volume of data more manageable for auditing and reconciliation. Individual sub-transactions that are otherwise shown as a single aggregated record in other transaction manager screens may be viewed and/or modified. For example, if an individual sub-transaction is incorrect, instead of updating the total transaction amount at the grouping level, modification may be made at the sub-transaction level. Specifically, if a casino slot system erroneously sends over duplicate Bills Inserted transactions that are aggregated into a single record shown for a patron, a manager may correct the aggregated total by modifying or removing the individual duplicate sub-transactions.

In one embodiment, the Entegrity system 50 may also provide a feature to aggregate like-transaction types that have been configured as sub-transaction types, such that the like-transaction types are shown as one aggregated transaction record. This feature allows high-volume transaction types (such as a stack of inserted bills) to be displayed as a singular record showing the overall total per patron, per gaming day.

Appendix A FIG. 67 and Appendix A FIG. 68 illustrate additional configurations that may affect the transaction manager module 54. For example, transaction entries may optionally display sub-transactions, which may be further edited. For one or more transaction types, such as personal checks and payroll checks, additional information may be stored such as instrument number, issuing institution, routing number, etc.

Additional information may be entered/associated with each sub-transaction. For example, where casinos issue chips with RFID technology, RFID information may be entered for transactions involving such chips. The transaction information may also identify the cage and cashier associated with the transaction (such as based upon associating of information regarding the location and time the chips are scanned and the information obtained from the chips during the scan). One aspect of this feature is that the chips may be logged to the system as having been provided to a Patron 1, whereas the chips may be redeemed by Patron 2, whereby Patron 2 may be designated as an agent of Patron 1 in the system.

The additional configurations may allow flexibility in what transaction types are supported, what fields are available for each transaction type (such as showing withholding fields or race and sports fields), and how each one should be reported on the CTR. Appendix A FIG. 68 allows further flexibility by the ability to configure what tender types are supported. The instrument/monetary/tender types may have different pertinent information hidden from transaction manager or shown as optional or required. Examples of configurable information for a tender type like person or payroll checks may include but are not limited to instrument number, issuing institution, and routing number.

Appendix A FIG. 111 illustrates an exemplary user interface for the transaction manager module 54, where transactions totals are sorted by day, and incomplete validation for one or more patron profiles is identified. The "Incomplete" checkbox and "Incomplete Reason" entry may identify patron profiles with missing information.

Appendix A FIG. 112 illustrates an exemplary user interface for a transaction duplicate check module in the transaction manager module 54, where duplicative transactions and/or patron profiles may be identified. A sliding scale may be used to adjust the sensitivity for comparison of patron profiles. For example, a high sensitivity may require all associated information to be identical in order to identify a duplicate record. A lower sensitivity may require less information to be identical (such as identical names but different addresses to account for patrons who have moved), or may permit variables in information (such as variables entries for addresses that use both "st" and "street"). Duplication check may be performed based on patron information such as name, birthdate, address, social security number, etc. Duplication check may be performed to identify one or more patrons associated with the same information (such as first or last name, birthdate, social security number, identification number, or address).

SAR Manager Module

As indicated above, in accordance with another embodiment of the invention, the system may be configured to implement SAR manager functionality. Aspects of this functionality will be described with reference to Appendix A FIGS. 69 to 86, which illustrate exemplary user interfaces that may be displayed in accordance with operation/use of the SAR manager module 56.

Appendix A FIG. 69 illustrates an exemplary user interface for the main page of the SAR manager module 56, which may include a search/filter feature, and a SAR results display feature. The search/filter feature may be used to identify desired SAR reports using one or more criteria. Search/filter criteria include but are not limited to property, date ranges, audit flags, and subject filters. Audit flags permit the identification of incomplete, rejected, verified, and/or approved SAR reports. Audit flags may also identify SARs that have been automatically or manually acknowledged by regulators to contain errors. Additional audit flags may be added. Subject filters include patron information discussed above and illustrated in Appendix A FIGS. 42-44. Subject filters may also include organization information (as discussed above and illustrated in Appendix A FIG. 4). The search results may include color-coding similar to the color coding discussed above and illustrated in Appendix A FIG. 39.

Appendix A FIGS. 70-72 and Appendix A FIG. 83 illustrate exemplary user interfaces for a search result in the SAR manager module 56 and the associated subject card. The subject card displayed in the SAR review module is similar to the subject card discussed in the transaction manager module. In one embodiment, one or more subject information (such as personal information or physical description fields) in the subject card displayed in the SAR review module is set to read-only such that the fields may not be edited in the SAR review module.

A SAR form may be manually entered. The SAR form may provide for the selection of standard information such as amount and date, as well as a customizable entry field for additional information. Customized entries may be stored and may be used as an auto-fill suggestion for future entries. Manual entry of description may include character limits.

The SAR form may include additional features such as a "Discrete" option for filing (such that the form may be manually entered into the regulator's submission site), and an option to attach supporting documents for proof of submission (such as confirmation emails and other proof that submission was successful.

Appendix A FIG. 73 illustrates an exemplary user interface for the SAR batch status review page in the SAR manager module 56, where a history of SAR forms may be displayed for batch-level review, which may display information related to the submission of the SAR forms. An SAR "batch" is an XML file that contains one or more SAR forms represented in XML format. A filter module may be included such that the history of SAR forms may be filtered by casino property, date range, submission status (such as manual entry of form, form set for scheduled filing, or forms identified for immediate filing), filing status (such as open, acknowledged, posted, acknowledged with errors, submitted, rejected, etc.).

Appendix A FIG. 74 illustrates an exemplary user interface for the SAR batch status page in the SAR manager module 56, where a history of SAR forms may be displayed for form-level review, which may display information related to the nature of the SAR form (such as subject name, nature of the reported activity, etc.). A filter module may be included such that the history of SAR forms may be filtered by casino property, date range, submission status (such as manual entry of form, form set for scheduled filing, or forms identified for immediate filing), filing status (such as open, acknowledged, posted, acknowledged with errors, submitted, rejected, etc.).

Appendix A FIG. 75 and Appendix A FIG. 76 illustrate a portion of the exemplary user interface for the SAR history page in the SAR manager module 56, where a history of SAR forms may be displayed for batch-level review. SAR batches may be updated with submission status, or the batch grid may be exported or used to generate further reporting (such as an audit log). Updated status may include additional features such as date of status change, and an option to attach additional documents, which may then be downloaded by accessing the same batch. It is contemplated the Entegrity system 50 may be further integrated with other systems (such as an API provided by any recipient of the SAR filing) such that status updates may be automatically provided and updated in real-time.

Appendix A FIG. 77 illustrates an exemplary user interface for the manual acknowledgment feature on the SAR batch status page in the SAR manager module 56, where batches may be manually acknowledged. If a SAR form is acknowledged with errors, the Entegrity system 50 may automatically create a copy of it in the SAR review module to maintain the original form for record-keeping. Further updates to the form (such as to fix the error) may not affect the copy of the original form.

Appendix A FIG. 78 illustrates an exemplary user interface for search results of SAR forms in the SAR manager module 56 based on a date range and/or a search for most current forms.

Appendix A FIG. 79 illustrates an exemplary user interface for search results of SAR forms in the SAR manager module 56 which may include revisions that were later amended/corrected and may be indicated by sequence numbers.

Appendix A FIG. 80 illustrates an exemplary compact view of an XML display for a submitted SAR form in the SAR manager module 56, where errors may be easily identified.

Appendix A FIG. 81 illustrates an exemplary expanded view in the SAR manager module 56 of an XML display for a submitted SAR form on a first side, and a formatted file in user-readable format of the form (mimics PDF form) on a second side. Each field on either side may be manually selected, such that the corresponding entry may be automatically highlighted on the other side.

Appendix A FIG. 82 illustrates an exemplary user interface for entry of a SAR form on the SAR history page in the SAR manager module 56, where all SAR elements may be exported for audit. SAR elements include but are not limited to status, filing type, submission details (such as date and method), etc. Exports may be in the form of an excel spreadsheet, or any other form an auditor may require. Select SAR forms, a range of SAR forms in a search result, or all of SAR forms in a search result may be selected for export.

Appendix A FIG. 83 illustrates an exemplary user interface in the SAR manager module 56 for a pop-up window upon using an edit feature on SAR forms filed with the "Discrete" option discussed above and illustrated in Appendix A FIG. 72.

Appendix A FIG. 84 illustrates an exemplary user interface for the SAR form module in the SAR manager module 56, where SAR forms may be filled out and submitted. Information used to fill out SAR forms may be retrieved from the Entegrity system 50 or any other system 20-24, 90 in communication with the Entegrity system 50, and/or manually entered. The Entegrity system 50 may detect and flag changes to retrieved information. The SAR management module 56 may note change information such as source, date, and all versions of the change, to preserve the integrity of the data associated with the retrieved information. SAR submissions and audits may reflect such change information.

Changes made to the retrieved information after a SAR form has been filled out and/or submitted may cause the SAR management module to automatically update the SAR form. Previous versions of the SAR form may be automatically saved. In one embodiment, user/administrator approval is required to update SAR forms. Similarly, revisions directly made to existing SAR forms may also require additional user/administrator approval.

Appendix A FIG. 85 illustrates an exemplary user interface for the batch creation feature in the SAR manager module 56. Batch creation may be used for electronic submission or manual filing.

Appendix A FIG. 86 illustrates an exemplary user interface for the print feature in the SAR manager module 56, where one or more SAR forms may be printed, and the format and content of the print-out may be customized.

CTR Management Module

As also described above, the system may be configured to implement CTR manager functionality. Aspects of this functionality will be described with reference to Appendix A FIGS. 87 to 104 and 105-110, which illustrate exemplary user interfaces that may be displayed in accordance with operation/use of the CTR manager module 58.

Appendix A FIG. 87 illustrates an exemplary user interface for the menu access to the CTR management module 58.

Appendix A FIG. 88 illustrates an exemplary user interface for the main page of the CTR management module 58 (also referred to as the "CTR Review" page), which may include a search/filter feature, and a CTR results display feature. The search/filter feature may be used to identify desired CTR reports using one or more criteria. Search/filter criteria include but are not limited to property, date ranges, audit flags, and subject filters. Audit flags permit the identification of incomplete, rejected, verified, and/or approved CTR reports. Audit flags may also identify automatic or manual entries of CTRs containing patron or transaction information, where such information has changed, or CTRs that have been acknowledged to have errors by the regulator. Additional audit flags may be added. Subject filters include patron information discussed above and illustrated in Appendix A FIGS. 42-44. Subject filters may also include organization information. The search results may include color-coding similar to the color coding discussed above and illustrated in Appendix A FIG. 39. The color-coding may, for example, provide a visual indication of the status of each CTR, such as whether it is complete or incomplete, etc. Additional color-coding may be associated with audit flags.

Appendix A FIG. 89 illustrates an exemplary user interface in the CTR manager module 58 for a pop-up window upon using an edit feature on CTR forms filed with the "Discrete" option for filling (such that the form is manually typed directly into the regulator's submission site).

Appendix A FIG. 90 illustrates an exemplary user interface for the submission of CTR forms in the CTR manager module 58. In one embodiment, more than one report may be submitted simultaneously. Upon submission, the status of the CTR forms may automatically be updated.

Appendix A FIG. 91 illustrates an exemplary user interface for various options associated with printing CTR forms in the CTR manager module 58.

Appendix A FIG. 92 illustrates an exemplary user interface for the CTR results display feature in the CTR manager module 58, which permits editing of certain information on the CTR forms from the displayed results, without having to access individual CTR forms. Such display feature may include the display visual alerts of changes to subject or transaction information on the CTR forms and permit updating of the CTR forms with changed information.

Appendix A FIG. 93 illustrates an exemplary user interface for the CTR results display feature in the CTR manager module 58, where a subject card may be displayed in association with a selected result. In one embodiment, one or more subject information (such as personal information or physical description fields) in the subject card displayed in the CTR module is set to read-only such that the fields may not be edited in the CTR module.

Appendix A FIG. 94 illustrates exemplary user interfaces for expanded rows for the following which may be associated with a selected CTR result: (1) transaction details, which may include more than one transaction, (2) patron profile details, which may include more than one patron profile, and (3) casino location/property details, which may include more than one location/property.

Appendix A FIGS. 95-99 illustrate exemplary user interfaces for the CTR form module in the CTR manager module 58, where CTR forms may be filled out, and where CTR form data may be submitted. Information used to fill out CTR forms may be retrieved from the Entegrity system 50 or any other system 20-24, 90 in communication with the Entegrity system 50, and/or manually entered. The Entegrity system 50 may detect and flag changes to retrieved information. The CTR management module may note change information such as source, date, and all versions of the change, to preserve the integrity of the data associated with the retrieved information. CTR submissions and audits may reflect such change information.

Changes made to the retrieved information after a CTR form has been filled out and/or submitted may cause the CTR management module to automatically update the CTR form. If a form is created and not yet submitted, the CTR Filing Institution (Step 1) and Transaction Location (Step 2) will be automatically updated with changes. Otherwise, the system will not automatically update a CTR form once submitted. Changes to the CTR information may be flagged by the system so user can decide whether to apply changes. Previous versions of the CTR form may be automatically saved. In one embodiment, user/administrator approval is required to update CTR forms. Similarly, revisions directly made to existing CTR forms may also require additional user/administrator approval. In one embodiment, if a submitted CTR form is returned by the regulator because of errors, then a copy of the original submission is created by the system and the copy is displayed in the CTR Review page for user to audit.

Appendix A FIG. 100 illustrates an exemplary user interface for the identification of one or more subjects (patrons or patron profiles) associated with the submission of a CTR form in the CTR manager module 58, or one or more subject fields associated with a patron profile (such as more than one passports or addresses). Information used to fill out the subject portion of the CTR forms may be retrieved from the Entegrity system 50 or any other system 20-24, 90 in communication with the Entegrity system 50, and/or manually entered. A potential edit feature permits editing of certain information on the CTR forms from the displayed results, without having to access individual CTR forms. In "Edit Subject" and/or "Edit Transaction" popups, a user may access the CTR form (via the edit feature), where changes are not applied directly to the form, but through the popup.

Appendix A FIG. 101 illustrates an exemplary user interface for the identification of one or more transactions associated with the submission of a CTR form in the CTR manager module 58. Information used to fill out the transaction portion of the CTR forms may be retrieved from the Entegrity system 50 or any other system 20-24, 90 in communication with the Entegrity system 50, and/or manually entered. A potential edit feature permits editing of certain information on the CTR forms from the displayed results, without having to access individual CTR forms. In "Edit Subject" and/or "Edit Transaction" popups, a user may access the CTR form (via the edit feature), where changes are not applied directly to the form, but through the popup.

Appendix A FIG. 102 illustrates an exemplary user interface for the CTR batch page in the CTR manager module 58, where a history of CTR batches may be displayed for batch-level review. A CTR "batch" is an XML file that contains one or more CTR forms represented in XML format. CTR batches and/or individual CTR forms may be updated with submission status. The batch grid may be exported or used to generate further reporting (such as an audit log). Updated status may include additional features such as the ability for user to edit the date of a of manually submitted batch (as illustrated in Appendix A FIG. 105), add one or more comments to a batch (as illustrated in Appendix A FIG. 106), remove a CTR form from a batch (as illustrated in Appendix A FIG. 107), print CTR forms (as illustrated in Appendix A FIG. 91) and manually acknowledge a batch (as illustrated in Appendix A FIG. 108). It is contemplated the Entegrity system 50 may be further integrated with other systems (such as an API provided by any recipient of the CTR filing) such that status updates may be automatically provided and updated in real-time. In one embodiment, reports may be manually flagged as "past due", or set to be automatically flagged as "past due" after a predetermined number of days have passed since submission of the report. This functionality may be specific to the CTR Review page where users may filter displayed results by "past due".

A filter module may be included such that the history of CTR batches may be filtered by casino property, date range, submission status (such as manual submission of batch, form set for scheduled filing, or forms identified for immediate filing), filing status (such as open, acknowledged, posted, acknowledged with errors, submitted, rejected, etc.).

Appendix A FIG. 103 illustrates an exemplary user interface for the CTR batch page in the CTR manager module 58, where a history of CTR forms may be displayed for form level review, which may display information related to the nature of the CTR form. A filter module may be included such that the history of CTR forms may be filtered by casino property, date range, submission status (such as manual submission of batches, form set for scheduled filing, or forms identified for immediate filing), filing status (such as open, acknowledged, posted, acknowledged with errors, submitted, rejected, etc.).

Additional features may include the ability for user remove a CTR form from a batch (as illustrated in Appendix A FIG. 107), print CTR forms (as illustrated in Appendix A FIG. 17) and manually acknowledge a batch (as illustrated in Appendix A FIG. 108).

Appendix A FIG. 104 illustrates an exemplary user interface for entry of a CTR form on the CTR History page in the CTR management module 58, where all CTR elements may be exported for audit. CTR elements may include but are not limited to subject and transaction details, status, filing type, submission details (such as date and method), etc.

Exports may be in the form of an Excel spreadsheet, or any other form an auditor may require. CTR form search results may be restricted to current form version only. Select CTR forms, a range of CTR forms in a search result, or all of CTR forms in a search result may be selected for export.

Appendix A FIG. 105 illustrates exemplary user interface in the CTR manager module 58 for a pop-up window which may be used to modify the user and/or submission date of a manually submitted CTR Appendix A FIG. 106 illustrates exemplary user interface in the CTR manager module 58 for a pop-up window which may be used to append comments to batches of CTR results.

Appendix A FIG. 107 illustrates exemplary user interface in the CTR manager module 58 for a batch of CTR results associated with a select casino property. Individual CTR entries may be removed from batch. In one embodiment, a CTR entry removed from a batch may automatically be identified for CTR review.

Appendix A FIG. 108 illustrates an exemplary user interface for the manual acknowledgment feature on the CTR batch status page in the CTR manager module 58, where batches may be manually acknowledged. If a CTR form is acknowledged with errors, the Entegrity system 50 may automatically create a copy of it in the CTR review module to maintain the original form for record-keeping. Further updates to the form (such as to fix the error) may not affect the copy of the original form.

Appendix A FIG. 109 illustrates an exemplary compact view of an XML display for a submitted CTR form in the CTR management module 58, where errors may be easily identified.

Appendix A FIG. 110 illustrates an exemplary expanded view in the CTR management module 58 of an XML display for a submitted CTR form on a first side, and a formatted file in user-readable format of the form (mimics PDF form) on a second side. Each filed on either side may be manually selected, such that the corresponding entry may be automatically highlighted on the other side.

The system may also include a setup manager module 60 (as illustrated in FIG. 1 and in Appendix A FIG. 2). This module may be set up based on casino customer surveys and customized to individual casino needs.

The CTR manager module 58 may include similar view XML functionality as the SAR manager module 56 (as described above and illustrated in Appendix A FIGS. 80-81).

Additional Features and Advantages of the Invention

Aspects of the invention comprise receiving, storing and processing information regarding casino patrons and their activities. In one embodiment, one or more interfaces are utilized to facilitate the input and/or display of such information, where such interfaces are uniquely configured to implement receiving such information and displaying information. Other aspects of the invention comprise the storage and processing of such information, wherein interfaces having other configurations than those described herein may be utilized.

In one embodiment of the invention, information is logged, such as by time and date of entry and/or modification, and by author/user. Such logs may be utilized to create a complete record of information, including changes, such as for auditing purposes.

The system and method of this invention present an advantage over conventional casino management systems, where patron profiles and transactions may be stored in separate systems, and may not be integrated with each other, let alone integrated with other systems such as SAR, CTR, accounting, player tracking, etc. Further, separate casino properties may not be able to access one or more systems of other casino properties, where data may be duplicated for the same patrons. Finally, these separate systems in the casino may not be integrated with external systems to automatically retrieve data needed for validation and/or due diligence of patrons and/or transactions, and with external systems that address AML requirements and the casinos' reporting needs. This invention presents a single system to unify the separate systems, and the creation of federated patron profiles/accounts, which serves both as a casino patron profile, and a system of record for AML systems, thus presenting the holistic view that regulators desire.

It will be appreciated that while exemplary configurations of user interfaces have been disclosed, the functionality described herein may be implemented by other interface or in other manners.

What is claimed is:

1. A system for centralized casino patron activity tracking of patrons of a plurality of casinos, comprising:

a centralized casino patron activity server comprising a processor, a memory, a communication interface and machine-readable code stored in said memory and executable by said processor;

a database which is accessible by said processor of said centralized casino patron activity server;

wherein said centralized casino patron activity server is in communication with at least a first casino management system of a first casino which stores information regarding a patron in association with a first patron ID and a surveillance system of said first casino and a second casino management system of a second casino which stores information regarding the patron in association with a second patron ID and a surveillance system of said second casino;

said machine-readable code of the centralized casino patron activity server configured to, when executed by said processor, cause said processor to:

create a centralized patron record in the database for the patron, said centralized patron record for said patron linked to a third patron ID, which third patron ID is cross-linked to the first patron ID and the second patron ID, the centralized patron record including a patron identity profile and having patron activity information associated therewith;

receive first information regarding one or more activities from the first casino management system, the first information associated with the first patron ID;

identify said first information as corresponding to said patron based on said linking of said first patron ID to said third patron ID;

update the patron activity information associated with the centralized patron record for the patron in the database with the first information;

receive second information regarding one or more activities from the second casino management system, the second information associated with the second patron ID;

identify said second information as corresponding to the patron based upon said linking of said second patron ID to said third patron ID;

update the patron activity information associated with the centralized patron record for the patron in the database with the second information;

receive at least one photo or video from said surveillance system of said first casino and said second casino and store said at least one photo or video with said patron identity profile of said centralized patron record; and generate patron activity information from the stored patron activity information for said patron in response to a user query which includes one or more designated characteristics which match characteristics of the patron associated with the at least one photo or video of the patron associated with the identity profile of the patron.

2. The system in accordance with claim 1, wherein said centralized patron record further comprises a patron status, said patron status comprising at least one of banned and barred.

3. The system in accordance with claim 1, wherein said centralized patron record further comprises a plurality of addresses of the patron, at least one of which is designated a master address.

4. The system in accordance with claim 1, wherein said centralized patron record further comprises information regarding an outcome of one or more validations performed upon an identity or assets of the patron.

5. The system in accordance with claim 1, wherein said machine-readable code is configured to cause said processor to receive information from a third-party source regarding wealth of the patron and associate said information from said third-party source with the centralized patron record.

6. The system in accordance with claim 1, wherein said machine-readable code is configured to cause said processor to receive information regarding one or more associated actors of the patron and associate the information regarding the one or more associated actors with the centralized patron record.

7. The system in accordance with claim 6, wherein the one or more associated actors comprise at least one of a person and an entity.

8. The system in accordance with claim 7, wherein either the patron or the associated actor is identified as a primary actor as between the patron and each associated actor.

9. The system in accordance with claim 1, wherein said system further comprises at least one user device having a display, and wherein said machine-readable code is configured to cause said processor to cause said display of the user device to display a subject manager graphical user interface which is configured to receive one or more search criteria for a search for a patron record in the database.

10. The system in accordance with claim 9, wherein the processor is further configured to cause the display of the user device to display a patron record based upon information associated with the centralized patron record, the displayed patron record including at least one image of the patron.

11. The system in accordance with claim 9, wherein said machine-readable code is further configured to cause said processor to generate transaction records corresponding to one or more transactions.

12. The system in accordance with claim 11, wherein said machine-readable code is further configured to cause said processor to generate a list of said transaction records.

13. The system in accordance with claim 11, wherein each of said transaction records comprises information regarding a corresponding monetary amount, which amount comprises one or more of an amount of cash, chips and a monetary value ticket.

14. The system in accordance with claim 11, wherein said machine-readable code is further configured to cause said processor to generate one or more suspicious activity reports (SARs) based upon the one or more transactions.

15. The system in accordance with claim 14, wherein said machine-readable code is configured to cause said processor to group the one or more SARs into a batch for processing.

16. The system in accordance with claim 11, wherein said machine-readable code is further configured to cause said processor to generate one or more currency transaction reports (CTRs) based upon said one or more transactions.

17. The system in accordance with claim 16, wherein said system further comprises at least one user device having a display, and wherein said machine-readable code is configured to cause said processor to cause said display of the at least one user device to display a list of said CTRs and a processing status of each CTR.

18. The system in accordance with claim 11, wherein said one or more transactions comprise casino monetary transactions.

19. The system in accordance with claim 1, wherein said machine-readable code of the centralized casino patron activity server is further configured to associate the patron identity profile with one or more organization profiles of one or more corresponding organizations in order to identify whether the patron conducts transactions for any of the one or more corresponding organizations.

20. The system in accordance with claim 1, wherein said machine-readable code of the centralized casino patron activity server is further configured to search for the patron identity profile in the database, and if the search does not reveal the patron identity profile in the database, facilitate a search for the patron in an external system.

* * * * *